US011044590B2

(12) United States Patent
El Assaad et al.

(10) Patent No.: US 11,044,590 B2
(45) Date of Patent: Jun. 22, 2021

(54) VEHICLE, APPARATUS, METHOD AND COMPUTER PROGRAM FOR COMMUNICATING IN MULTIPLE MOBILE COMMUNICATION SYSTEMS

(71) Applicant: Volkswagen Aktiengesellschaft, Wolfsburg (DE)

(72) Inventors: Ahmad El Assaad, Wolfsburg (DE); Steffen Schmitz, Wesel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/430,781

(22) Filed: Jun. 4, 2019

(65) Prior Publication Data
US 2019/0380015 A1  Dec. 12, 2019

(30) Foreign Application Priority Data
Jun. 7, 2018 (EP) .................................. 18176483

(51) Int. Cl.
*H04W 4/46* (2018.01)
*H04W 72/04* (2009.01)
*H04B 7/06* (2006.01)

(52) U.S. Cl.
CPC ............ *H04W 4/46* (2018.02); *H04B 7/0617* (2013.01); *H04W 72/044* (2013.01)

(58) Field of Classification Search
CPC ............ G08G 1/096791; G08G 1/161; H04B 7/0452; H04B 7/0617; H04B 7/086; H04B 7/088; H04W 4/46; H04W 72/044
(Continued)

(56) References Cited

U.S. PATENT DOCUMENTS 6,240,098 B1   5/2001  Thibault et al. .............. 370/431
6,377,782 B1 * 4/2002  Bishop ................ H04L 12/2801
                                                                              370/277
(Continued)

FOREIGN PATENT DOCUMENTS

DE       69604595 T2    5/2000  ............... H04B 7/04
EP        2575404 A1    4/2013  ............... H04L 5/00
(Continued)

OTHER PUBLICATIONS

Extended European Search Report, Application No. 18176483.8, 13 pages, dated Nov. 16, 2018.
(Continued)

*Primary Examiner* — Tan H Trinh
(74) *Attorney, Agent, or Firm* — Slayden Grubert Beard PLLC

(57) ABSTRACT

Embodiments relate to a vehicle, an apparatus, a method and a computer program for communicating in multiple mobile communication systems. An apparatus for a vehicle communicating in multiple mobile communication systems comprises one or more interfaces configured to communicate in the mobile communication systems using an adaptive antenna. The apparatus comprises a control module configured to control the one or more interfaces. The control module is further configured to determine a setting for the adaptive antenna to obtain spatially separated signals using the same time and frequency resources, and to detect different messages from the spatially separated signals.

15 Claims, 4 Drawing Sheets

(58) Field of Classification Search
USPC ........ 455/63.1, 562.1, 41.1, 41.2, 502, 63.4, 455/575.9; 370/201, 277, 328; 375/260; 342/189

See application file for complete search history.

(56) References Cited

U.S. PATENT DOCUMENTS

| | | | | |
|---|---|---|---|---|
| 6,571,097 | B1* | 5/2003 | Takai | H04B 7/086 |
| | | | | 455/436 |
| 7,453,854 | B2* | 11/2008 | Fujishima | H04B 7/0408 |
| | | | | 370/328 |
| 8,989,762 | B1* | 3/2015 | Negus | H04B 7/0632 |
| | | | | 455/454 |
| 9,953,538 | B1* | 4/2018 | Matthiesen | B60Q 1/268 |
| 10,389,037 | B2* | 8/2019 | Johnson | H01Q 13/24 |
| 10,411,356 | B2* | 9/2019 | Johnson | H01Q 3/34 |
| 2002/0127978 | A1* | 9/2002 | Khatri | H04B 7/0617 |
| | | | | 455/103 |
| 2004/0001554 | A1* | 1/2004 | Sun | H04B 7/0848 |
| | | | | 375/260 |
| 2005/0153733 | A1* | 7/2005 | Park | H04W 88/06 |
| | | | | 455/552.1 |
| 2008/0075033 | A1* | 3/2008 | Shattil | H04J 13/004 |
| | | | | 370/328 |
| 2008/0161056 | A1* | 7/2008 | Hovers | H04B 7/0695 |
| | | | | 455/562.1 |
| 2009/0010149 | A1 | 1/2009 | Lee et al. | 370/208 |
| 2009/0209256 | A1* | 8/2009 | Nakashima | H04W 36/0088 |
| | | | | 455/436 |
| 2010/0103900 | A1 | 4/2010 | Yeh et al. | 370/330 |
| 2010/0248635 | A1* | 9/2010 | Zhang | H04B 7/0413 |
| | | | | 455/63.1 |
| 2012/0113794 | A1* | 5/2012 | Roman | H04B 7/0452 |
| | | | | 370/201 |
| 2014/0163814 | A1* | 6/2014 | Rousu | G07C 5/0808 |
| | | | | 701/33.9 |
| 2014/0256338 | A1* | 9/2014 | Xu | H04W 28/18 |
| | | | | 455/450 |
| 2015/0005033 | A1* | 1/2015 | Petersson | H04W 8/183 |
| | | | | 455/558 |
| 2015/0204966 | A1* | 7/2015 | Kishigami | G01S 13/325 |
| | | | | 342/189 |
| 2016/0128025 | A1* | 5/2016 | Zhang | H04J 11/005 |
| 2016/0210859 | A1* | 7/2016 | Grotendorst | G08G 1/093 |
| 2016/0278065 | A1* | 9/2016 | Kim | H04W 16/28 |
| 2016/0315680 | A1* | 10/2016 | Braun | H04B 7/0617 |
| 2016/0330728 | A1* | 11/2016 | Sorrentino | H04W 72/048 |
| 2016/0347310 | A1* | 12/2016 | Moran | B60W 30/09 |
| 2016/0359596 | A1* | 12/2016 | Wild | H04B 7/0695 |
| 2018/0098203 | A1* | 4/2018 | Schultz | G08G 1/096716 |
| 2018/0115960 | A1* | 4/2018 | Sorrentino | H04W 72/042 |
| 2018/0123632 | A1* | 5/2018 | Posselt | H04B 1/082 |
| 2018/0146398 | A1* | 5/2018 | Kim | H04W 72/0406 |
| 2018/0213376 | A1* | 7/2018 | Pinheiro | H04W 76/14 |
| 2018/0227802 | A1* | 8/2018 | Lehmann | H04L 1/00 |
| 2018/0324718 | A1* | 11/2018 | Serrano | H04W 56/0015 |
| 2019/0052436 | A1* | 2/2019 | Desai | H04W 76/14 |
| 2019/0090218 | A1* | 3/2019 | Noh | H04W 72/005 |
| 2019/0115657 | A1* | 4/2019 | Hwang | H01Q 1/242 |
| 2019/0132723 | A1* | 5/2019 | Sorrentino | H04W 8/005 |
| 2019/0219685 | A1* | 7/2019 | Shan | G01S 13/931 |
| 2019/0229952 | A1* | 7/2019 | Sun | H04L 25/022 |
| 2019/0288760 | A1* | 9/2019 | Li | H04L 27/2646 |
| 2019/0289561 | A1* | 9/2019 | Corley | H04B 1/7083 |
| 2019/0318631 | A1* | 10/2019 | Seaman | H04W 12/02 |
| 2019/0349731 | A1* | 11/2019 | Hehn | H04W 4/12 |
| 2019/0349796 | A1* | 11/2019 | Hehn | H04W 4/70 |
| 2019/0364492 | A1* | 11/2019 | Azizi | H04W 24/08 |
| 2020/0029340 | A1* | 1/2020 | He | H04W 72/044 |

FOREIGN PATENT DOCUMENTS

| | | | |
|---|---|---|---|
| WO | 2019/048384 A1 | 3/1919 | |
| WO | 2008/069415 A1 | 6/2008 | ............ H04L 27/26 |
| WO | 2015/120089 A1 | 8/2015 | ............ H04L 27/00 |

OTHER PUBLICATIONS

European Office Action, Application No. 18176183.8, 8 pages. dated Mar. 25, 2021.

\* cited by examiner

VEHICLE, APPARATUS, METHOD AND COMPUTER PROGRAM FOR COMMUNICATING IN MULTIPLE MOBILE COMMUNICATION SYSTEMS

CROSS-REFERENCE TO RELATED APPLICATIONS

This application claims priority to European Patent Application EP 18176483.8, filed on Jun. 7, 2018 with the European Patent Office. The contents of this application are incorporated herein for all purposes.

TECHNICAL FIELD

The present invention relates to a vehicle, an apparatus, a method and a computer program for communicating in multiple mobile communication systems, more particularly, but not exclusively to a concept for inter-vehicular communication with coexisting access technologies in the same frequency band.

BACKGROUND

Mobile communication systems have been developed and deployed in multiple generations. More and more features and functionalities are introduced into new releases of mobile communication systems. Inter-vehicular communication is one of the features recently introduced and it allows vehicles communicating with each other with the purpose traffic control and coordination. There are multiple coexistent systems for this purpose. The 3rd Generation Partnership Project (3GPP) specified a vehicle-to-everything (V2X) modus for their standard. The Institute for Electrical and Electronics Engineers specified a wireless interface under 802.11p for car-to-car communication.

Document DE 696 04 595 T2 describes a concept using spatial multiplexing and de-multiplexing for users of a mobile communication system. Document EP 2 575 404 A1 describes a determination of whether an SDMA-component (Spatial Division Multiple Access) of a mobile communication system is activated or deactivated. US 2009/0010149 A1 discloses a virtual multi-antenna method for a communication system. A combination of Multi-User Detection (MUD) and SDMA is described in US 2010/0103900 A1. Document WO 2008/069415 A1 discloses a switched beam-forming concept for downlink transmission and an adaptive beamforming concept for uplink transmission.

SUMMARY

There is a demand for an improved concept for vehicular communication. The independent claims provide an improved concept for vehicular communication. The dependent claims and the following description discuss various embodiments.

Embodiments are based on the finding that adaptive antennas can be used in vehicles to separate signals impinging from different directions. Particularly in case of inter vehicle direct communication spatial separation of signals can be used to distinguish different vehicles, which may as well use different access technologies. More efficient use may be made of the spectrum in case multiple access technologies coexist, e.g. V2X and 802.11p, in the same spectrum.

BRIEF DESCRIPTION OF THE DRAWINGS

In the FIGS.

DETAILED DESCRIPTION

Figure 1:
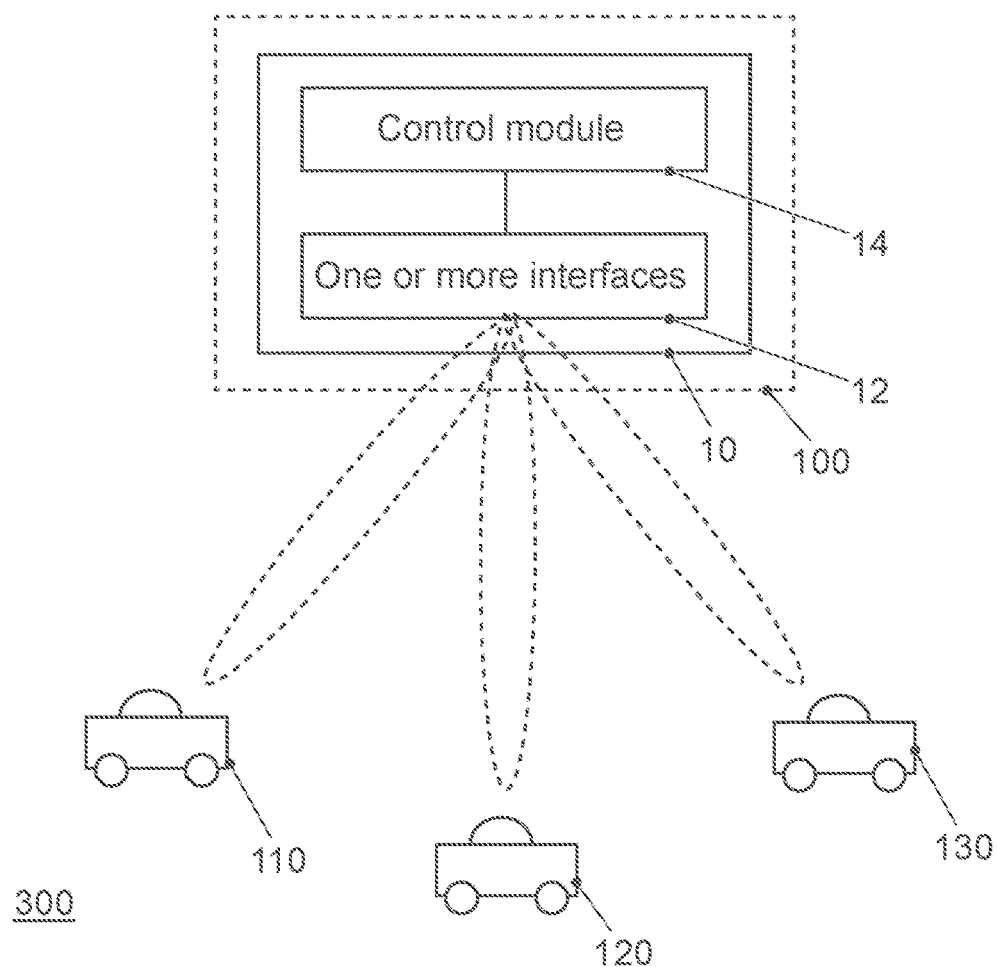
FIG. 1 illustrates an embodiment of an apparatus for a vehicle, an embodiment of a vehicle and an embodiment of a system.

In some embodiments, an apparatus for a vehicle communicating in multiple mobile communication systems is provided. The apparatus may comprise one or more interfaces configured to communicate in the mobile communication systems using an adaptive antenna. The apparatus further may comprise a control module configured to control the one or more interfaces. The control module may further be configured to determine a setting for the adaptive antenna to obtain spatially separated signals using the same time and frequency resources, and to detect different messages from the spatially separated signals. Embodiments may provide improved spectral efficiency for vehicular communication through spatial multiplexing.

In some embodiments, the spatially separated signals are based on at least two different radio access technologies. Embodiments may reduce inter system interference by spatial separation. For example, the control module may comprise at least two signal processing paths according to two different radio access technologies in embodiments, which may enable standard processing components in series to spatial separation of signals of the different access technologies. The control module may be configured to spatially de-multiplex and assign signals to the at least two signal processing paths according to the two different radio access technologies in some embodiments. Embodiments may enable simultaneous vehicular communication in multiple access technologies using the same frequency band. In some embodiments, the at least two mobile communication systems may comprise a vehicle-to-vehicle communication system according to 3rd Generation Partnership Project specifications and a 802.11p system according to the Institute of Electrical and Electronics Engineers specifications. Embodiments may reduce 802.11p and V2V interference in a coexistence scenario.

In further embodiments, the adaptive antenna may comprise multiple antenna elements and the control module may be configured to obtain the spatially separated signals using beamforming and/or spatial interference cancellation techniques. Embodiments may improve inter vehicle communication through spatial processing. The control module may be configured to form at least 8 angular sections around the vehicle to spatially separate the signals. Embodiments may provide efficient spatial processing by using fixed beams or sectorization. In further embodiments, the control module may be configured to use adaptive beamforming in a base band to separate the signals. Embodiments may provide enhanced system capacity through adaptive beamforming. The control module may be configured to estimate an angular direction of a signal using predefined pilot or synchronization signal settings of a radio access technology. Embodiments may enable radio access technology detection using correlation analysis of system characterizing signals.

In some embodiments, the control module may be configured to extract a signal based on the estimated angular direction. Embodiments may enable efficient angular signal detection through estimation of an arrival angle of a signal. The control module may be further configured to apply a further interference cancellation or multi-user detection algorithm to a spatially separated signal. A vehicle comprising an embodiment of the apparatus described herein is a further embodiment. In some embodiments, the control module may be configured to utilize antenna elements at different positions on the vehicle as adaptive antenna.

A further embodiment is a method for a vehicle communicating in multiple mobile communication systems. The method may comprise determining a setting for the adaptive antenna to obtain spatially separated signals using the same time and frequency resources. The method further may comprise detecting different messages from the spatially separated signals.

Embodiments further provide a computer program having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

The above and other features and aspects will be described using the following non-limiting exemplary embodiments of apparatuses or methods or computer programs or computer program products by way of example only and with reference to the accompanying figures. In the FIGS., the thicknesses of lines, layers, or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present.

Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates an embodiment of an apparatus 10 for a vehicle 100. FIG. 1 further illustrates a embodiments of a vehicle 100 comprising an embodiment of the apparatus 10. An embodiment of a system 300 is further shown in FIG. 1 comprising an embodiment of the vehicle 100 and further vehicles 110, 120, 130.

The embodiment of the apparatus 10 for the vehicle 100 is configured to communicate in multiple mobile communication systems 300. The apparatus 10 comprises one or more interfaces 12 configured to communicate in the mobile communication systems 300 using an adaptive antenna. The apparatus 10 further comprises a control module 14, which is configured to control the one or more interfaces 12. The control module 14 is further configured to determine a setting for the adaptive antenna to obtain spatially separated signals using the same time and frequency resources. The apparatus 10 is further configured to detect different messages from the spatially separated signals. The spatially separated signals may be based on at least two different radio access technologies.

In embodiments, the one or more interfaces 12 may correspond to any means for obtaining, receiving, transmitting or providing analog or digital signals or information, e.g. any connector, contact, pin, register, input port, output port, conductor, lane, etc. which allows providing or obtaining a signal or information. An interface may be wireless or wireline and it may be configured to communicate, i.e. transmit or receive signals, information with further internal or external components. The one or more interfaces may comprise further components to enable according communication in the mobile communication system 300, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more frequency components, etc. The one or more interfaces 12 use an adaptive antenna and may hence be coupled to one or more antennas or antenna elements, which may correspond to any transmit and/or receive antennas, such as horn antennas, dipole antennas, patch antennas, sector antennas etc. The antennas may be arranged in a defined geometrical spacing, e.g. half-wavelength spacing, and setting, such as a uniform array, a linear array, a circular array, a triangular array, a uniform field antenna, a field array, combinations thereof, etc. The one or more interfaces 12 or the adaptive antenna may further comprise components to implement a spatially adaptive or adjustable antenna beam pattern.

For example, the adaptive antenna may enable to steer an antenna beam in different angular directions. In some embodiments, such a beam may have a maximum achievable antenna gain and the adaptive antenna may allow pointing said beam in different directions. The direction may be discrete and in some embodiments beams for different directions may be switchable, e.g. in terms of a fixed beam switching concept. In further embodiments, antenna diagrams may be adaptively processed and may have any arbitrary form. For example, depending on the scenario it may be more beneficial to direct spatial nulls in certain directions of strong interferers rather than directing a maxim antenna gain, e.g. in terms of spatial mulling or spatial interference cancellation. Embodiments may realize any antenna concept that may allow spatially separating signals arriving from different angular directions to a certain extent.

In some embodiments, such antenna concepts may be based on estimating an angle of arrival (AoA) or direction of arrival (DoA) for certain signals, e.g. using MUSIC (Multiple Signal classification) or ESPRIT (Estimation of Signal Parameters via Rotational Invariance Techniques). Based on the estimated AoA or DoA, signals may be spatially filtered or separated. In some embodiments, the one or more interfaces 12 may serve the purpose of transmitting or receiving or both, transmitting and receiving, information, such as information related to capabilities, application requirements, requests, message interface configurations, feedback, information related to control commands etc.

In embodiments, the control module 14 may be implemented using one or more processing units, one or more processing devices, any means for processing, such as a processor, a computer or a programmable hardware component being operable with accordingly adapted software. In other words, the described functions of the control module 14 may as well be implemented in software, which is then executed on one or more programmable hardware components. Such hardware components may comprise a general purpose processor, a Digital Signal Processor (DSP), a micro-controller, etc.

In at least some embodiments, the adaptive antenna may be implemented as antenna module, which may comprise one of more antennas and which may correspond to any transmit and/or receive antennas. The antenna module may comprise a phase array antenna, e.g. a circular array antenna and/or a roof antenna/an antenna suitable for a roof the vehicle. In some embodiments, antennas of the antenna module may be arranged at different sides of the vehicle. For example, the antenna module may comprise one or more elements of the group of a front-facing antenna, a back-facing antenna and a side-facing antenna. The directions (front facing, back facing, side facing) may be defined in relation to a direction of travel of the vehicle.

FIG. 1 also shows an embodiment of a system 300 comprising embodiments of the apparatus 10, the vehicle 100, respectively. The other vehicles 110, 120, 130 may also be embodiments comprising other embodiments of the apparatus 10. In embodiments, communication, i.e., transmission, reception or both, may take place among mobile transceivers/vehicles 100, 110, 120, 130 directly and/or between mobile transceivers/vehicles 100, 110 120, 130 and a network infrastructure component (e.g. a base station, a network server, a backend server, etc.) Such communication may make use of a mobile communication system 300. In other words, such communication may be carried out directly, e.g. by means of Device-to-Device (D2D) communication, which may also comprise Vehicle-to-Vehicle (V2V) communication in case of vehicles 100, 110, 120, 130 or Car-to-Car communication. Such communication may be carried out using the specifications of a mobile communication system 300.

The mobile communication system 300 may, for example, correspond to one of the Third Generation Partnership Project (3GPP)-standardized mobile communication networks, where the term mobile communication system is used synonymously to mobile communication network. The mobile or wireless communication system may correspond to a mobile communication system of the 5th Generation (5G) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11 (802.11p in particular for car-2-car), generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

A base station transceiver can be operable or configured to communicate with one or more active mobile transceivers/vehicles 100, 110, 120, 130 and a base station transceiver can be located in or adjacent to a coverage area of another base station transceiver, e.g. a macro cell base station transceiver or small cell base station transceiver. Hence, embodiments may provide a mobile communication system 300 comprising two or more mobile transceivers/vehicles 100, 110, 120, 130 and one or more base station transceivers, wherein the base station transceivers may establish macro cells or small cells, as e.g. pico-, metro-, or femto cells. A mobile transceiver may correspond to a smartphone, a cell phone, user equipment, a laptop, a notebook, a personal computer, a Personal Digital Assistant (PDA), a Universal Serial Bus (USB)-stick, a car, a vehicle etc. A mobile transceiver may also be referred to as User Equipment (UE) or mobile in line with the 3GPP terminology. A vehicle 100, 110, 120, 130 may correspond to any conceivable means for transportation, e.g. a car, a bike, a motorbike, a van, a truck, a bus, a ship, a boat, a plane, a train, a tram, etc.

A base station transceiver can be located in the fixed or stationary part of the network or system. A base station transceiver may correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver 100, 110, 120, 130 can be associated with a base station transceiver or cell. The term cell refers to a coverage area of radio services provided by a base station transceiver, e.g. a NodeB (NB), an eNodeB (eNB), a remote radio head, a transmission point, etc. A base station transceiver may operate one or more cells on one or more frequency layers, in some embodiments a cell may correspond to a sector. For example, sectors can be achieved using sector antennas, which provide a characteristic for covering an angular section around a remote unit or base station transceiver. In some embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Mobile transceivers 100, 110, 120, 130 may communicate directly with each other, i.e., without involving any base station transceiver, which is also referred to as Device-to-Device (D2D) communication. An example of D2D is direct communication between vehicles, also referred to as Vehicle-to-Vehicle communication (V2V). In order to do so radio resources are used, e.g. frequency, time, code, and/or spatial resources, which may as well be used for wireless communication with a base station transceiver. The assignment of the radio resources may be controlled by the base station transceiver, i.e. the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, direct Cellular Vehicle-to-Anything (C-V2X), where V2X includes at least V2V, V2-Infrastructure (V2I), etc., transmission according to 3GPP Release 14 can be managed by infrastructure (so-called mode 3) or run in a User Equipment (UE) Autonomous mode (UEA), (so-called mode 4). In embodiments, the two or more mobile transceivers in vehicles 100, 110, 120, 130 as indicated by FIG. 1 may be registered in the same mobile communication systems 300. In other embodiments, one or more of the mobile transceivers 100, 110, 120, 130 may be registered in different mobile communication systems 300. The different mobile communication systems 300 may use the same access technology but different operators or they may use different access technologies as outlined above. In at least some embodiments, the one or more interfaces 12 are configured to communicate via a vehicular communication network, e.g. via a Car-to-Car (C2C), Car-to-X (C2X), Vehicle-to-Vehicle (V2V) or Vehicle-to-X (V2X) communication network. The one or more interfaces 12 may be configured to communicate directly with other vehicles, i.e., without involving any base station transceiver, which is also referred to as Device-to-Device (D2D) communication. In some embodiments, the communication may be aided by a base station transceiver, e.g. in terms of resource management or assignment.

In further embodiments, the control module 14 comprises at least two signal processing paths according to two different radio access technologies. Embodiments may enable spatial de-multiplexing of coexisting radio technologies. Embodiments may hence enable to operate multiple radio technologies in the same frequency band simultaneously. Although the different radio access technologies may interfere each other, the corresponding messages may be decoded using spatial separation of the signals.

Figure 2:
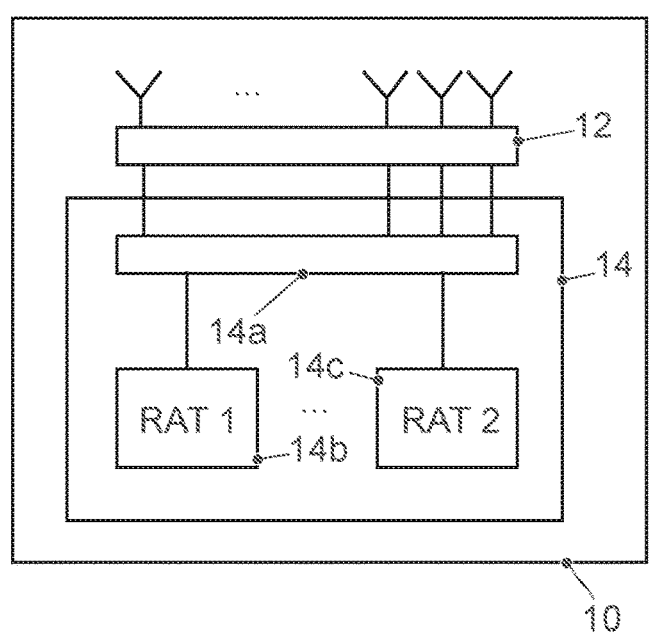
FIG. 2 shows another embodiment of an apparatus.

FIG. 2 shows an embodiment of an apparatus 10, in which the control module 14 comprises a spatial filter 14*a* for processing antenna signals from the one or more interfaces 12. After spatial filtering 14*a* the signals of different radio access technologies (RAT 1, RAT 2) are processed in different (parallel) paths 14*b*, 14*c*, these paths may be transmit signal paths, receive signal paths, or both. As indicated in FIG. 2, in some embodiments, the control module 14 is configured to spatially de-multiplex and assign signals to the at least two signal processing paths 14*b*, 14*c* according to the two different radio access technologies. The adaptive antenna may comprise multiple antenna elements and the control module 14 may be configured to obtain the spatially separated signals using beamforming and/or spatial interference cancellation techniques.

In embodiments, the control module 14 may be configured to use adaptive beamforming in a base band to separate the signals. In other embodiments other techniques are conceivable, e.g. a BUTLER matrix may be used in the transmission band to implement a fixed beam switching or a sectorization approach, which may be implemented statically and may therefore use less complex processing. Such concepts may as well be realized in the complex base band. For example, the control module 14 may be configured to estimate an angular direction of a signal using predefined pilot or synchronization signal settings of a radio access technology. Each radio access technology may have characteristic signals, which may be used for detection and spatial separation. Such signals may comprise reference signals or symbols, pilot signals or symbols, synchronization signals or symbols, etc. The control module 14 may be configured to extract a signal based on the estimated angular direction, where ESPRIT and MUSIC are potential algorithms to be used for this purpose. At least in some embodiments, the control module 14 is additionally configured to apply a further interference cancellation or multi-user detection algorithm to a spatially separated signal. These techniques may provide additional benefits, for example with respect to a signal-to-interference ratio. For example, non-orthogonal access methods may also be applied in terms of such processing. In some embodiments, when a signal of one radio access technology is detected in one path, the signal may be subtracted from a signal of the other path, thereby improving detection quality. Based on such interference cancellation techniques there may be different parallel, serial or iterative processing implementations.

Figure 3:
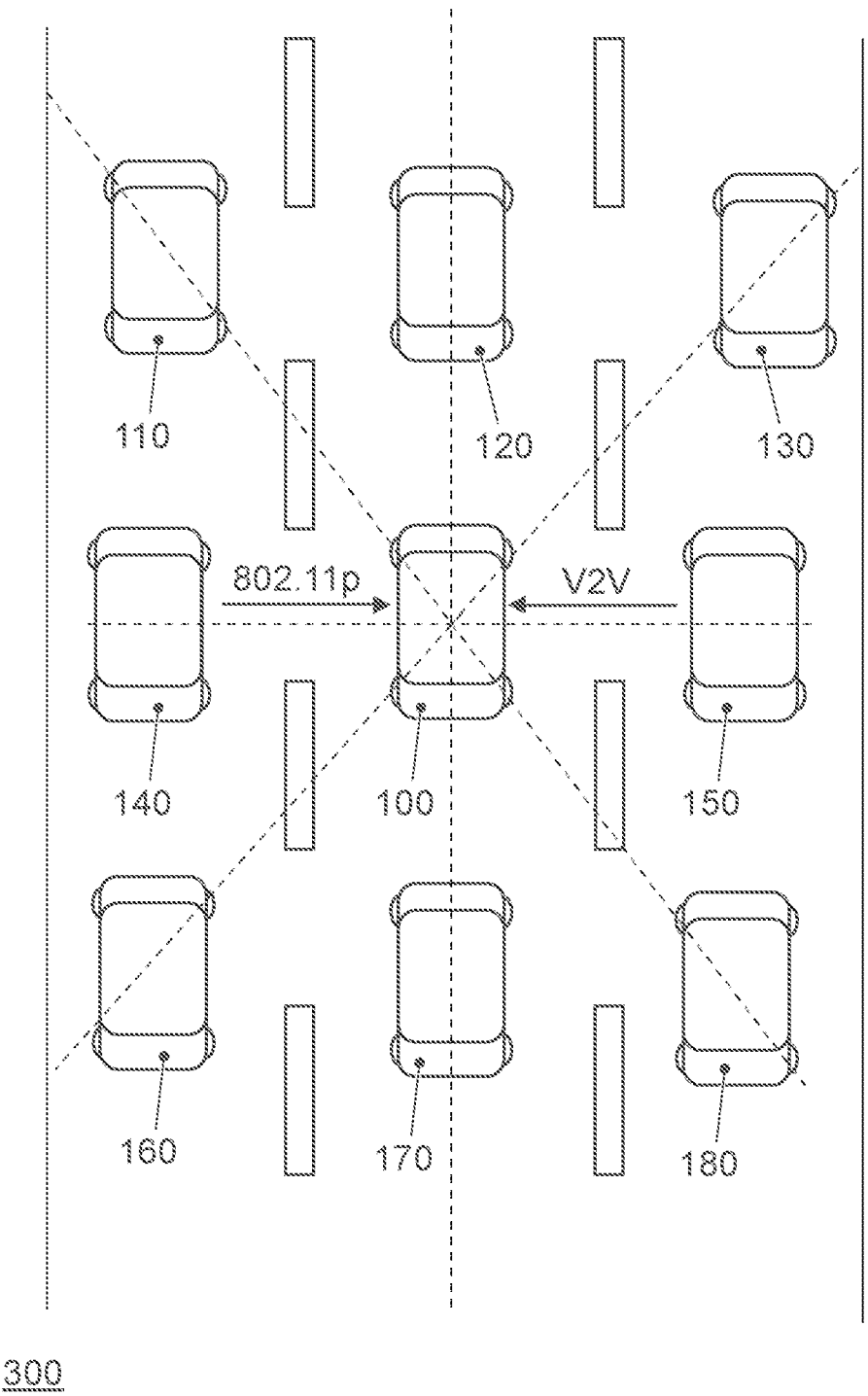
FIG. 3 shows a traffic scenario with an embodiment of a vehicle.

For example the at least two mobile communication systems 300 comprise a vehicle-to-vehicle communication system according to 3rd Generation Partnership Project specifications and a 802.11p system according to the Institute of Electrical and Electronics Engineers specifications. FIG. 3 shows a traffic scenario and an embodiment of a vehicle 100 is located in the center of the traffic scenario on a three lane highway. As shown in FIG. 3, the vehicle 100 is surrounded by a number of further road users 110, 120, 130, 140, 150, 160, 170, 180. As an example it is assumed that vehicle 140 communicates using 802.11p and vehicle 140 communicates using V2V using the same frequency band, e.g. 5.9 GHz. In this embodiment, the control module 14 is configured to form at least 8 angular sections around the vehicle to spatially separate the signals. As shown in FIG. 3, one constellation could be to have beams or sectors covering 45° angular sections around the vehicle. There are different options for achieving such a pattern. Examples are sectorized antennas, fixed beam forming, transmission band or base band beamforming, directional antennas, etc. Another option is to use antennas located on different sides or positions on the vehicle. The control module 14 may be configured to utilize antenna elements at different positions on the vehicle 100 as adaptive antenna.

Figure 4:
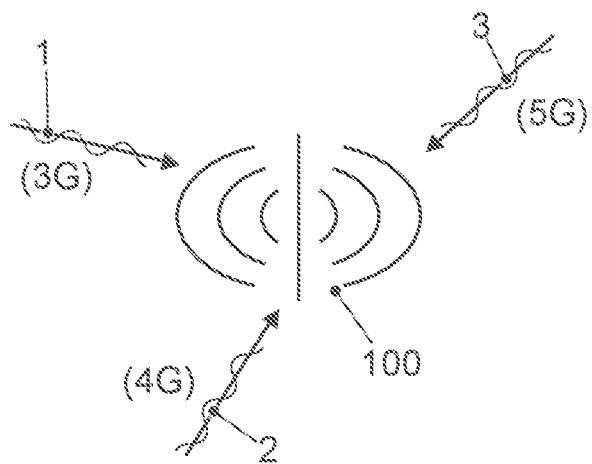
FIG. 4 illustrates an embodiment in a scenario with multiple coexistent radio access technologies.
Figure 4:
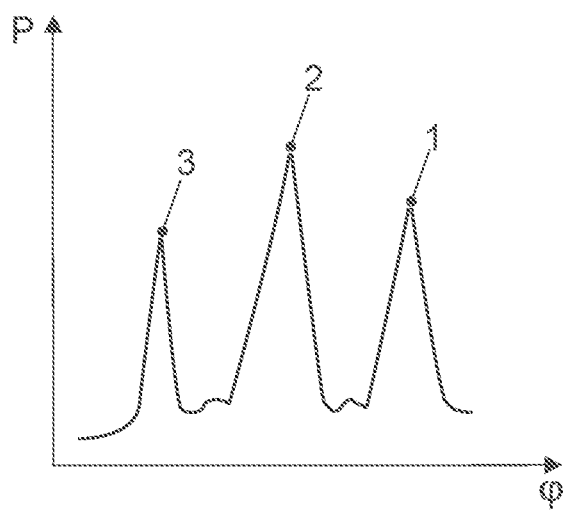

In further embodiments, there could be multiple RATs, e.g. 3G, 4G, 5G, etc. using the same time and frequency resources. The spatial separation could then be carried out with respect to the multiple RATs. FIG. 4 illustrates an embodiment in a scenario with multiple coexistent RATs. FIG. 4 shows a vehicle 100 at the top. Signals of multiple RATs (3G, 4G, 5G) are impinging from different angles or directions 1, 2, 3. DoA estimation is used and FIG. 4 shows at the bottom an angular sweep from the perspective of the vehicle 100. The view graph at the bottom of FIG. 4 shows the angle φ on the abscissa and power p on the ordinate. The three peaks corresponding to the directions 1, 2, 3 can clearly be seen for the different RATs at the different directions. The different RATs use the same frequency and are hence coexistent. The sensitivity for the different signals is altered by the co-existence effect. Using the adaptive antenna spatial inter-RAT interference cancellation can be carried out. For example, array processing for spatial separation of the different RATs can be used. The RATs may be distinguished or detected using pilot or reference symbols. As described above, the decoding of each radio technology may then be carried out in parallel.

In embodiments, different radios may be operated in different frequency bands. Especially important may be the case when different radios, which are aimed for the same purposes, are assumed to use to same frequency band, e.g. IEEE-802.11p and C-V2X on the 5.9 GHz band.

Embodiments may provide a concept, which allows for the operation of different radios on the same frequency bands simultaneously. For example, spatial de-multiplexing for spatial separation of radio technologies in the complex baseband may be used.

To separate overlapped complex baseband signals of different radio technologies, phased array antennas are used in some embodiments. The separation of samples belonging to different radio technologies can be carried out as follows:
  3D-AOA estimation using phased array antennas with coherent multi-channel receivers,
  extraction of signals of different RATs with spatial filtering. For example, the extraction of different RAT signals may be based on their estimated 3D-AOA values. This step may map the radio technologies into their estimated 3D-AOA,
  the radio access technologies are detected using a cross-correlation based method, which uses the synchronization and reference pilots of each RAT to detect the received RAT. The cross-correlation is maximized if the synchronization and reference pilots correspond to the considered RAT, and
  when the RATs are detected, they will be further processed for demodulation and decoding in parallel.

Hence, embodiments may allow coexistence of difference RATs on the same frequency band simultaneously, potentially allowing for more effective usage of the frequency spectrum and resolving of the coexistence between different RATS.

Figure 5:
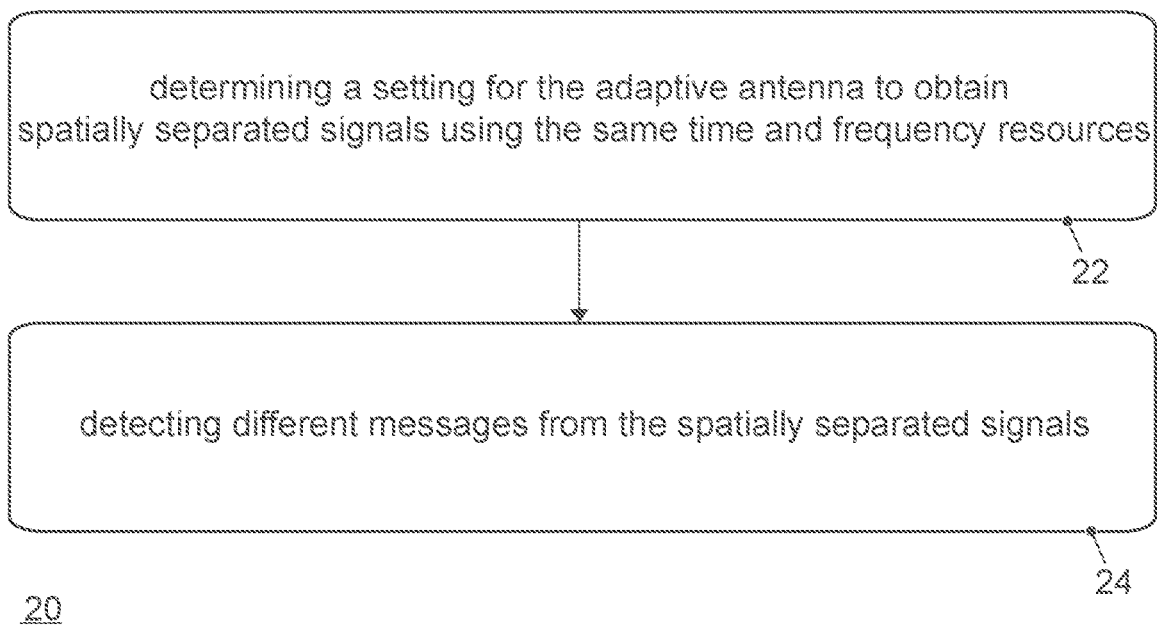
FIG. 5 shows a block diagram of a flow chart of an embodiment of a method for a vehicle.

FIG. 5 shows a block diagram of a flow chart of an embodiment of a method 20 for a vehicle 100. The vehicle 100 is configured to communicate in multiple mobile communication systems 300. The method 20 comprises determining 22 a setting for the adaptive antenna to obtain spatially separated signals using the same time and frequency resources, and detecting 24 different messages from the spatially separated signals.

As already mentioned, in embodiments, the respective methods or processing may be implemented as computer programs or codes, which can be executed on a respective hardware. Hence, another embodiment is a computer program having a program code for performing at least one of the above methods, when the computer program is executed on a computer, a processor, or a programmable hardware component. A further embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some embodiments are also intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks and magnetic tapes, hard drives, or optically readable digital data storage media. The embodiments are also intended to cover computers programmed to perform said steps of methods described herein or (field) programmable logic arrays ((F)PLAs) or (field) programmable gate arrays ((F)PGAs), programmed to perform said steps of the above-described methods.

The description and drawings merely illustrate the principles of the present invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

REFERENCE NUMBER LIST 10 apparatus for adapting a current route
12 one or more interfaces
14 control module
14a spatial filter
14b processing path RAT 1
14c processing path RAT 2
20 method for sharing sound data
22 determining a setting for the adaptive antenna to obtain spatially separated signals using the same time and frequency resources
24 detecting different messages from the spatially separated signals
100 vehicle
110 vehicle
120 vehicle
130 vehicle
140 vehicle
150 vehicle
160 vehicle
170 vehicle
180 vehicle
300 system The invention has been described in the preceding using various exemplary embodiments. Other variations to the disclosed embodiments can be understood and effected by those skilled in the art in practicing the claimed invention, from a study of the drawings, the disclosure, and the appended claims.

The mere fact that certain measures are recited in mutually different dependent claims or embodiments does not indicate that a combination of these measured cannot be used to advantage. Any reference signs in the claims should not be construed as limiting the scope.

What is claimed is:

1. An apparatus for a vehicle communicating in multiple different mobile communication systems simultaneously, the apparatus comprising:
   an adaptive antenna;
   a plurality of interfaces, connected with the adaptive antenna and configured to communicate in the multiple different mobile communication systems simultaneously using the adaptive antenna; and
   a control module, connected to the one or more interfaces and being configured to control the one or more interfaces; wherein the control module is further configured to:
   determine a setting for the adaptive antenna so that the adaptive antenna allows to simultaneously obtain spatially separated signals from the multiple different mobile communication systems using the same time and frequency resources; and to
   detect different messages from the spatially separated signals; wherein the simultaneously obtained spatially separated signals are based on at least two different radio access technologies.

2. The apparatus of claim 1, wherein the control module comprises at least two signal processing paths according to two different radio access technologies.

3. The apparatus of claim 2, wherein the control module is configured to spatially de-multiplex and assign signals to the at least two signal processing paths according to the two different radio access technologies.

4. The apparatus of claim 1, wherein the at least two mobile communication systems comprise a vehicle-to-vehicle communication system according to 3rd Generation Partnership Project specification and a 802.11p system according to the Institute of Electrical and Electronics Engineers specifications.

5. The apparatus of claim 1, wherein the adaptive antenna comprises multiple antenna elements and wherein the control module is configured to obtain the spatially separated signals using beamforming and/or spatial interference cancellation techniques.

6. The apparatus of claim 1, wherein the control module is configured to form at least 8 angular sections around the vehicle to spatially separate the signals.

7. The apparatus of claim 1, wherein the control module is configured to use adaptive beamforming in a base band to separate the signals.

8. The apparatus of claim 1, wherein the control module is configured to estimate an angular direction of a signal using predefined pilot or synchronization signal settings of a radio access technology.

9. The apparatus of claim 8, wherein the control module is configured to extract a signal based on the estimated angular direction.

10. The apparatus of claim 1, wherein the control module is further configured to apply a further interference cancellation or multi-user detection algorithm to a spatially separated signal.

11. A vehicle comprising the apparatus of claim 1.

12. The vehicle of claim 11, wherein the control module is configured to utilize antenna elements at different position on the vehicle as adaptive antenna.

13. The apparatus of claim 1, wherein the control module comprises a spatial filter.

14. A method for a vehicle communicating in multiple different mobile communication systems simultaneously using an adaptive antenna, the method comprising:
   determining a setting for the adaptive antenna, so that the adaptive antenna allows to simultaneously obtain spatially separated signals from the multiple different mobile communication systems using the same time and frequency resources; and
   detecting different messages from the spatially separated signals; wherein the simultaneously obtained spatially separated signals are based on at least two different radio access technologies.

15. A computer program comprising a non-transitory computer readable medium having a program code for performing the method of claim 14, when the computer program code is executed on a computer, a processor, or a programmable hardware component.

\* \* \* \* \*